United States Patent
Chen et al.

(10) Patent No.: US 12,362,586 B2
(45) Date of Patent: Jul. 15, 2025

(54) CHARGING APPARATUS, CHARGING METHOD, AND ELECTRONIC DEVICE

(71) Applicant: AUTEL INTELLIGENT TECHNOLOGY CORP., LTD., Guangdong (CN)

(72) Inventors: Huaming Chen, Guangdong (CN); Weikang Wang, Guangdong (CN); Honghua Lu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 780 days.

(21) Appl. No.: 17/651,852

(22) Filed: Feb. 21, 2022

(65) Prior Publication Data

US 2022/0181900 A1    Jun. 9, 2022

Related U.S. Application Data

(63) Continuation of application No. PCT/CN2020/115958, filed on Sep. 17, 2020.

(30) Foreign Application Priority Data

Sep. 18, 2019    (CN) .......................... 201910883317.7

(51) Int. Cl.
  *H02J 7/00*    (2006.01)
  *G07C 5/00*    (2006.01)
(52) U.S. Cl.
  CPC ........ *H02J 7/007182* (2020.01); *G07C 5/008* (2013.01); *H02J 7/0068* (2013.01); *H02J 7/00714* (2020.01); *H02J 2207/20* (2020.01)
(58) Field of Classification Search
  CPC ............................................... H02J 7/007182
(Continued)

(56) References Cited

U.S. PATENT DOCUMENTS 4,989,146 A * 1/1991 Imajo ..................... G07C 5/008
  702/183
7,620,484 B1 * 11/2009 Chen .................... G07C 5/0808
  701/31.5
(Continued)

FOREIGN PATENT DOCUMENTS

CN    102136742 A    7/2011
CN    105071513 A    11/2015
(Continued)

OTHER PUBLICATIONS

International search report of PCT/CN2020/115958 mailed Dec. 16, 2020.
(Continued)

*Primary Examiner* — Jerry D Robbins
(74) *Attorney, Agent, or Firm* — Andrew C. Cheng

(57) ABSTRACT

A charging apparatus, a charging method, and an electronic device are provided. The charging apparatus includes a first charging module, a second charging module, a microprocessor and a voltage adjustment module. The microprocessor is connected to the first charging module and the second charging module. The voltage adjustment module is connected to the first charging module and the second charging module. The microprocessor is configured for controlling the first charging module and the second charging module to charge a battery. The first charging module is configured for supplying power to a vehicle diagnosis system and charging the battery. The second charging module is configured for charging the battery. A device that needs to be charged is charged by means of both the first charging module and the second charging module, and the charging current is controllable, such that the charging efficiency is improved.

20 Claims, 9 Drawing Sheets

(58) Field of Classification Search
USPC .......................................................... 320/138
See application file for complete search history.

(56) References Cited

U.S. PATENT DOCUMENTS

| | | | | |
|---|---|---|---|---|
| 10,706,645 | B1* | 7/2020 | Herron | G07C 5/0825 |
| 2006/0078175 | A1* | 4/2006 | Brozovich | G06F 1/1637 |
| | | | | 340/5.83 |
| 2008/0252256 | A1 | 10/2008 | Parker et al. | |
| 2012/0035800 | A1* | 2/2012 | Roberts | G07C 5/0808 |
| | | | | 701/29.1 |
| 2013/0031318 | A1* | 1/2013 | Chen | G07C 5/00 |
| | | | | 711/E12.001 |
| 2022/0085631 | A1* | 3/2022 | Shum | H02J 7/007182 |

FOREIGN PATENT DOCUMENTS

| | | | |
|---|---|---|---|
| CN | 105098932 | A | 11/2015 |
| CN | 205819118 | U | 12/2016 |
| CN | 106300513 | A | 1/2017 |
| CN | 109358548 | A | 2/2019 |
| CN | 109510272 | A | 3/2019 |
| CN | 110518672 | A | 11/2019 |
| CN | 211530765 | U | 9/2020 |
| EP | 3514915 | A1 | 7/2019 |
| WO | 2018192314 | A1 | 10/2018 |

OTHER PUBLICATIONS

First office action of CN patent application No. 201910883317.7 issued on Mar. 27, 2024.
Search report of CN patent application No. 201910883317.7 issued on Mar. 27, 2024.
Extended European Search Report dated Oct. 21, 2022; Appln. No. 20865412.9.

* cited by examiner

CHARGING APPARATUS, CHARGING METHOD, AND ELECTRONIC DEVICE

CROSS-REFERENCE TO RELATED APPLICATIONS

The present application is continuation application of International Application No. PCT/CN2020/115958, filed on Sep. 17, 2020, which claims priority to the Chinese Patent Application No. 201910883317.7, filed to the Chinese patent office on Sep. 18, 2019, which are incorporated herein by reference in its entirety.

TECHNICAL FIELD

The present application relates to the technical field of charging devices, in particular to a charging apparatus, a charging method and an electronic device.

BACKGROUND

A lithium ion battery is widely applied to various electronic devices, and therefore, if a fast charging technology for the lithium ion battery is mastered, the actual application of the electronic devices may be promoted, and the electronic devices have a vast commercial prospect. For example, the lithium ion battery may be applied to a vehicle diagnosis tablet computer. With the intelligent development of the vehicle diagnosis tablet computer, the vehicle diagnosis tablet computer is always faced with the user experience of being powered on, diagnosing and networking all the time, which increases the power consumption of a complete machine and lowers the user experience. Therefore, the improvement of the standby capability of the electronic devices has become a problem to be solved urgently.

SUMMARY OF THE DISCLOSURE

The technical problem to be solved by the present application is to provide a charging apparatus, a charging method and an electronic device so as to achieve fast charging of the electronic device and improve the standby capability of the electronic device.

In an aspect of an embodiment of the present application, provided is a charging apparatus applied to a vehicle diagnosis tablet computer including a vehicle diagnosis system and a battery, wherein the charging apparatus includes:
  a first charging module provided with a first output end outputting a direct current voltage and a second output end outputting a first charging current, wherein the direct current voltage is supplied to the vehicle diagnosis system;
  a second charging module provided with a third output end outputting a second charging current, wherein the battery is charged by the first charging current and the second charging current;
  a microprocessor connected to the first charging module and the second charging module and configured for controlling the first charging module and the second charging module to charge the battery; and
  a voltage adjustment module connected to the first charging module and the second charging module, configured for charging the first charging module and the second charging module and further configured for adjusting an input voltage of the second charging module.

Optionally, the first charging module includes a first charging chip and an inductor, the first charging chip is respectively connected to the inductor, the microprocessor and the voltage adjustment module, the inductor is connected to the first output end and the second output end, and the first charging chip is configured for supplying power to the vehicle diagnosis system by means of the inductor and charging the battery.

Optionally, the inductor is configured for reducing the power consumption of the first charging module, wherein the inductance of the inductor is greater than or equal to 1 uH and is smaller than or equal to 2 uH, and the internal resistance of the inductor is 0.01 ohm.

Optionally, the second charging module is a second charging chip with a two-phase switched capacitor architecture, and the second charging chip is configured for supplying the second charging current to the battery by means of the third output end.

Optionally, the voltage adjustment module includes a constant voltage adjustment module and an operational amplifier circuit, the constant voltage adjustment module is connected to the first charging module and the second charging module, and the operational amplifier circuit is connected to the constant voltage adjustment module;
  the constant voltage adjustment module is configured for receiving a charging voltage and converting the charging voltage into a constant voltage; and
  the operational amplifier circuit is configured for acquiring a voltage of the battery and inputting the voltage of the battery to the constant voltage adjustment module so that the input voltage of the second charging module is adjusted by the constant voltage adjustment module according to the voltage of the battery.

Optionally, the voltage adjustment module further includes an adapter connected to the constant voltage adjustment module; and the adapter is configured for inputting the charging voltage to the constant voltage adjustment module.

Optionally, the microprocessor is respectively connected to the first charging module and the second charging module by means of an I2C bus.

Optionally, the microprocessor controls the first charging module and the second charging module to charge the battery by means of:
  controlling the first charging module and the second charging module to charge the battery at a constant current charging stage; and
  controlling the first charging module and the second charging module to enter a constant voltage charging stage when the voltage of the battery reaches a preset cut-off voltage.

Optionally, the microprocessor controls the first charging module and the second charging module to enter the constant voltage charging stage by means of:
  stopping the second charging module charging the battery when the second charging current of the second charging module is smaller than or equal to a first preset cut-off current; and
  controlling the first charging module to further charge the battery.

Optionally, the microprocessor is configured for stopping the first charging module charging the battery when the first charging current of the first charging module is smaller than or equal to a second preset cut-off current.

In another aspect of an embodiment of the present application, provided is a charging method applied to a vehicle diagnosis tablet computer including a vehicle diagnosis system and a battery, wherein the charging method is executed by the above-mentioned charging apparatus, and the charging method includes:

when it is detected that the charging apparatus is charged by a voltage adjustment module, setting, by a microprocessor, charging currents of a first charging module and a second charging module, wherein the charging currents include a direct current voltage, a first charging current and a second charging current;

controlling, by the microprocessor, the direct current voltage to be output to the vehicle diagnosis system; and controlling, by the microprocessor, the first charging module and the second charging module to charge the battery;

wherein the first charging module outputs the direct current voltage and the first charging current, and the second charging module outputs the second charging current.

Optionally, the step of controlling, by the microprocessor, the first charging module and the second charging module to charge the battery includes:

controlling the first charging module and the second charging module to charge the battery at a constant current charging stage; and controlling the first charging module and the second charging module to enter a constant voltage charging stage when the voltage of the battery reaches a preset cut-off voltage.

Optionally, the step of controlling the first charging module and the second charging module to enter the constant voltage charging stage when the voltage of the battery reaches the preset cut-off voltage includes:

when the second charging current of the second charging module is smaller than or equal to a first preset cut-off current, stopping the second charging module charging the battery; and when the first charging current of the first charging module is smaller than or equal to a second preset cut-off current, stopping the first charging module charging the battery.

Optionally, when the vehicle diagnosis system is in a power-off state, the charging method further includes:

adjusting, by the microprocessor, the direct current voltage to be zero, and adjusting the first charging current as the maximum current of the first charging module; and charging, by the microprocessor, the battery according to the maximum current and the second charging current.

In further aspect of an embodiment of the present application, provided is an electronic device. The electronic device includes the above-mentioned charging apparatus.

Embodiments of the present application provide a charging apparatus, a charging method and an electronic device. The charging apparatus includes a first charging module, a second charging module, a microprocessor and a voltage adjustment module, wherein the first charging module is provided with a first output end and a second output end; the second charging module is provided with a third output end; the first output end outputs a direct current voltage which is supplied to a vehicle diagnosis system, and the second output end and the third output end respectively output a first charging current and a second charging current which charge a battery, and the microprocessor is configured for controlling the first charging module and the second charging module to charge the battery and is further configured for adjusting an input voltage of the second charging module. In the present embodiment, the battery may be charged by means of both the first charging module and the second charging module, and the charging current is controllable, so that the charging efficiency can be improved, a device can be fast charged, and the standby capability of the device is improved.

BRIEF DESCRIPTION OF THE DRAWINGS

One or more embodiments are illustrated with pictures in corresponding accompanying drawings, these illustrations do not constitute limitations on the embodiments, elements with the same reference numerals in the accompanying drawings indicate similar elements unless especially stated, and proportions are not limited by the pictures in the accompanying drawings.

DETAILED DESCRIPTION OF THE DISCLOSURE

In order to make objectives, technical solutions and advantages of the present application clearer and more understandable, the present application will be further described in detail below in conjunction with the accompanying drawings and embodiments. It should be understood that the specific embodiments described herein are merely intended to explain the present application, rather than to limit the present application.

It should be noted that all features in the embodiments of the present application may be combined with each other without conflicts and fall within the protection scope of the present application. In addition, although functional modules are divided in a schematic diagram of an apparatus and a logical sequence is shown in a process diagram, in some cases, the shown or described steps may be performed according to module division or sequence different from the module division in the schematic diagram of the apparatus or the sequence in the process diagram.

Figure 1:
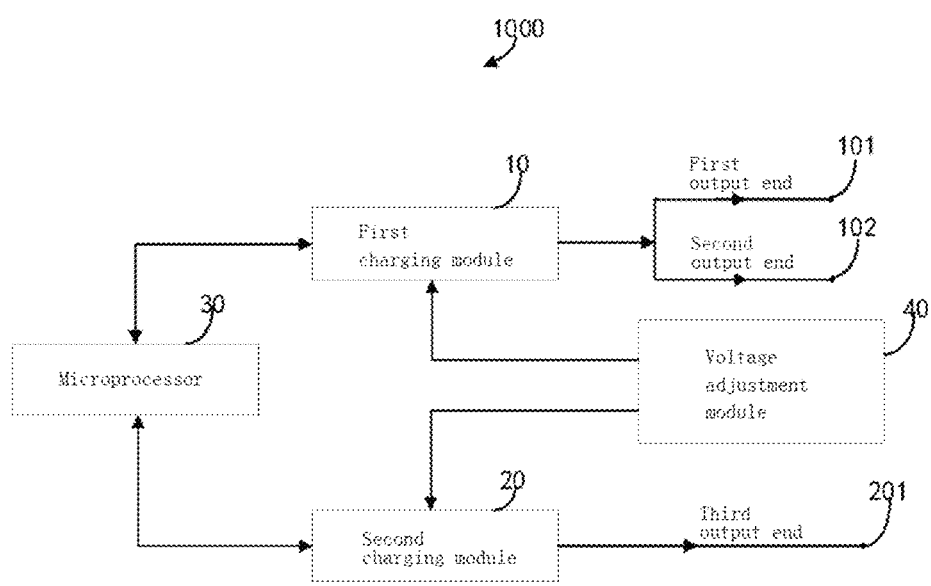
FIG. 1 is a schematic diagram showing a structure of a charging apparatus provided in an embodiment of the present application.

Reference is made to FIG. 1, an embodiment of the present application provides a charging apparatus 1000 which may be applied to a vehicle diagnosis tablet computer including a vehicle diagnosis system and a battery. The charging apparatus 1000 includes a first charging module 10, a second charging module 20, a microprocessor 30 and a voltage adjustment module 40. The first charging module 10 is provided with a first output end 101 and a second output end 102, and the second charging module 20 is provided with a third output end 201. The microprocessor 30 is respectively connected to the first charging module 10 and the second charging module 20, and the voltage adjustment module 40 is also respectively connected to the first charging module 10 and the second charging module 20.

The first charging module 10 is configured for supplying power to the vehicle diagnosis tablet computer and charging the battery, and the second charging module 20 is configured for charging the battery. Specifically, the first output end 101 outputs a direct current voltage which is supplied to the vehicle diagnosis system, the second output end 102 and the third output end 201 respectively output a first charging current and a second charging current which charge the battery.

The direct current voltage, the first charging current and the second charging current are all adjustable and may be respectively set by the microprocessor 30. For example, the microprocessor 30 is respectively connected to the first charging module 10 and the second charging module 20 by means of an I2C bus, and the microprocessor 30 modifies an internal register of the first charging module 10 and an internal register of the second charging module 20 by means of the I2C bus, so that the adjustability of the direct current voltage, the first charging current and the second charging current is achieved.

The microprocessor 30 is configured for setting the charging current output by the first charging module 10 and the second charging module 20, that is, the direct current voltage, the first charging current and the second charging current are set. The sum of a current corresponding to the direct current voltage and the first charging current is the charging current output by the first charging module 10, currents output by the first output end 101 and the second output end 102 may be distributed by the microprocessor 30 according to a physical truth. The microprocessor 30 is further configured for controlling the first charging module and the second charging module to charge the battery.

The voltage adjustment module 40 is used as a source for supplying power to the charging apparatus 1000 and is configured for charging the first charging module 10 and the second charging module 20. The voltage adjustment module 40 is further configured for adjusting an input voltage of the second charging module so as to ensure that the second charging module 20 normally works.

In the present embodiment, the charging apparatus 1000 works based on a basic principle as follows: when the charging apparatus 1000 needs to be configured to charge the vehicle diagnosis tablet computer, firstly, the microprocessor 20 detects whether the voltage adjustment module 40 supplies a charging voltage to the first charging module 10 and the second charging module 20, if yes, the microprocessor 30 sets relevant parameters such as charging currents, charging cut-off voltages, charging cut-off currents and the like of the first charging module 10 and the second charging module 20; then, the microprocessor 30 controls the first charging module 10 and the second charging module 20 to enter a fast charging stage and controls the first charging module 10 and the second charging module 20 to charge the battery at a constant current charging stage; when the voltage of the charged battery reaches the charging cut-off voltage, the first charging module 10 and the second charging module 20 are controlled to enter a constant voltage charging stage, at the moment, the charging current is gradually reduced; when the charging current reaches the preset cut-off current of the second charging module 20, the microprocessor 30 stops a charging function of the second charging module 20, the first charging module 10 further completes a constant voltage charging process, and the charging current of the first charging module 10 is further reduced; and when the charging current of the first charging module 10 reaches the preset cut-off current of the first charging module 10, the microprocessor 30 stops a charging function of the first charging module 10, and thus, charging is ended.

The charging apparatus 1000 will be specifically described below in conjunction with the accompanying drawings.

Figure 2:
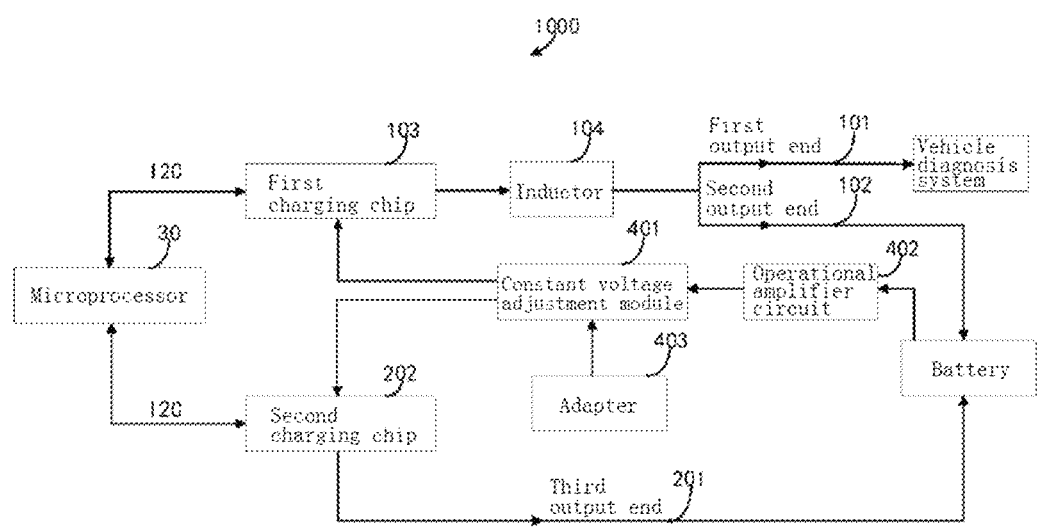
FIG. 2 is a schematic diagram showing a structure of a charging apparatus provided in another embodiment of the present application.

Reference is made to FIG. 2, the first charging module 10 includes a first output end 101, a second output end 102, a first charging chip 103 and an inductor 104, wherein the first charging chip 103 is respectively connected to the inductor 104, the microprocessor 103 and the voltage adjustment module 40, and the inductor 104 is connected to the first output end 101 and the second output end 102.

The first charging chip 103 may be a lithium ion battery charging module circuit which may achieve a process from constant current charging to constant voltage charging. The inductor 104 is configured for reducing the power consumption of the first charging module 10, and the inductance of the inductor may range from 1 uH to 2 uH, and the internal resistance of the inductor may be 0.01 ohm.

The voltage adjustment module 40 supplies a charging source to the first charging chip 103, and no protocol communication is involved in a process that the voltage adjustment module 40 transmits a current to the first charging chip 103. A DC-DC step-down circuit is formed together by the first charging chip 103 and the inductor 104, the DC-DC step-down circuit is capable of generating an output-adjustable voltage VSYS1 which may be output by means of the first output end 101 or the second output end 102 and may be controlled by the microprocessor 30, and the microprocessor 30 may achieve the adjustability of the charging voltage by modifying the internal register of the first charging chip 103 by means of the I2C bus. For example, the microprocessor 30 may input a corresponding signal to the first charging chip 103 to control the power on/off time of the DC-DC step-down circuit, thereby adjusting an output voltage. Specifically, for example, the charging apparatus 1000 is applied to the vehicle diagnosis tablet computer, if the highest output capability of the current of the first charging chip 103 is 5 A, the microprocessor 30 may control the first output end 101 to output a 2 A current for supplying power to the system of the vehicle diagnosis tablet computer and controls the second output end 102 to output a 3 A current for charging the battery of the vehicle diagnosis tablet computer by means of the DC-DC step-down circuit. It should be noted that the first output end 101 outputs the direct current voltage, the power consumption of the current thereof depends on the power consumption of the system, and the current may be other currents such as a 0.5 A current and 1 A current in addition to the 2 A current.

It may be understood that generally, when the vehicle diagnosis tablet computer is charged by means of the above-mentioned first charging chip 103, in an occasion where a battery with high capacity higher than 15000 mAh is applied, the battery may be fully charged by the 3 A charging current after about 6 h, and the higher the capacity of the battery, the longer the charging time of the battery.

In order to solve the above-mentioned problems, in the present embodiment of the present application, by means of the second charging module 20 and the voltage adjustment module 40, the charging efficiency is improved, and the charging time is shortened. Specifically, further reference is made to FIG. 2, the second charging module 20 includes a third output end 201 and a second charging chip 202, and the voltage adjustment module 40 includes a constant voltage adjustment module 401, an operational amplifier circuit 402 and an adapter 403. The second charging chip 202 is respectively connected to the microprocessor 30, the constant voltage adjustment module 401 and the third output end 201, and the constant voltage adjustment module 401 is respectively connected to the first charging chip 103, the second charging chip 202, the adapter 403 and the operational amplifier circuit 402.

Figure 3:
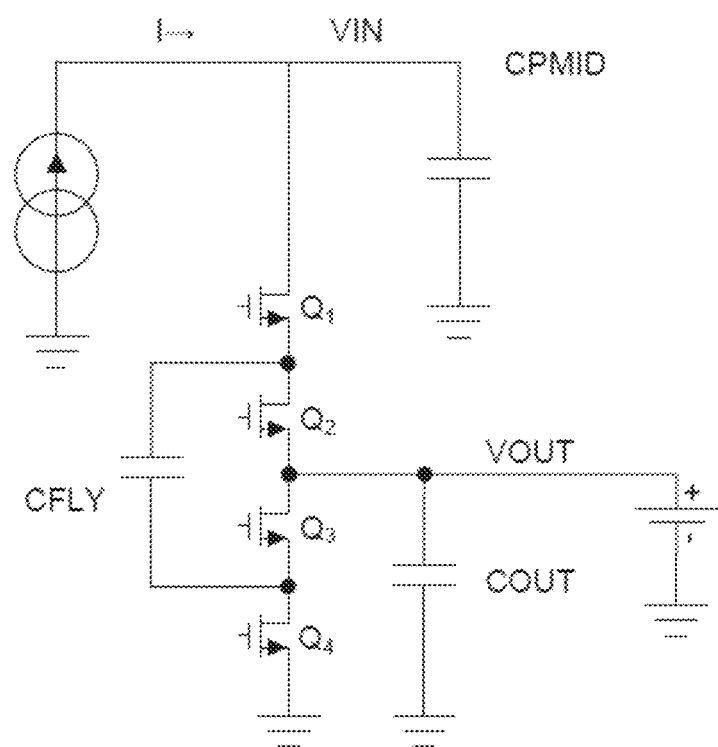
FIG. 3 is a circuit diagram of a second charging chip provided in an embodiment of the present application.

The second charging module 20 is the second charging chip 202 with a two-phase switched capacitor architecture, the second charging chip 202 may generate an output-adjustable charging voltage VSYS2 without externally hanging the inductor, the output-adjustable voltage VSYS2 may be output by means of the third output end 201 and may be controlled by the microprocessor 30, and the microprocessor 30 may achieve the adjustability of the charging voltage by modifying the internal register of the second charging chip 202 by means of the I2C bus. The second charging chip 202 may be specifically shown in FIG. 3 which is a simplified unidirectional switch circuit with a two-phase switched capacitor architecture. As shown in FIG. 3, when Q1 and Q3 are turned on and Q2 and Q4 are turned off, an input end VIN charges a capacitor CFLY, and a voltage of the left end of the CFLY is continuously increased; when Q2 and Q4 are turned on and Q1 and Q3 are turned off, charges of the charged CFLY are transferred to VOUT; and therefore, the unidirectional switch circuit with the two-phase switched capacitor architecture performs outputting according to a duty ratio of 50%. It should be noted that FIG. 3 is only configured as an example of the second charging chip 202 and is not configured for limiting the second charging chip 202. The third output end 201 is configured for outputting the charging voltage VSYS2, and the charging voltage output by the third output end 201 and the charging voltage output by the above-mentioned second output end 102 are both input to the same device (such as a battery).

The constant voltage adjustment module 401 may be specifically a DC-DC circuit which is configured for receiving a charging voltage and converting the charging voltage into a constant voltage. The charging voltage received by the constant voltage adjustment module 401 is supplied by the adapter 403, and the adapter 403 is mainly configured for supplying a charging source. For example, a 9 V to 36 V voltage input by the adapter may be converted into a 8 V constant voltage by means of the constant voltage adjustment module 401, and the 8 V constant voltage is configured as the input voltage of the first charging chip 103 and the second charging chip 202, and thus, the charging of a wide-voltage adapter is achieved.

Figure 4A:
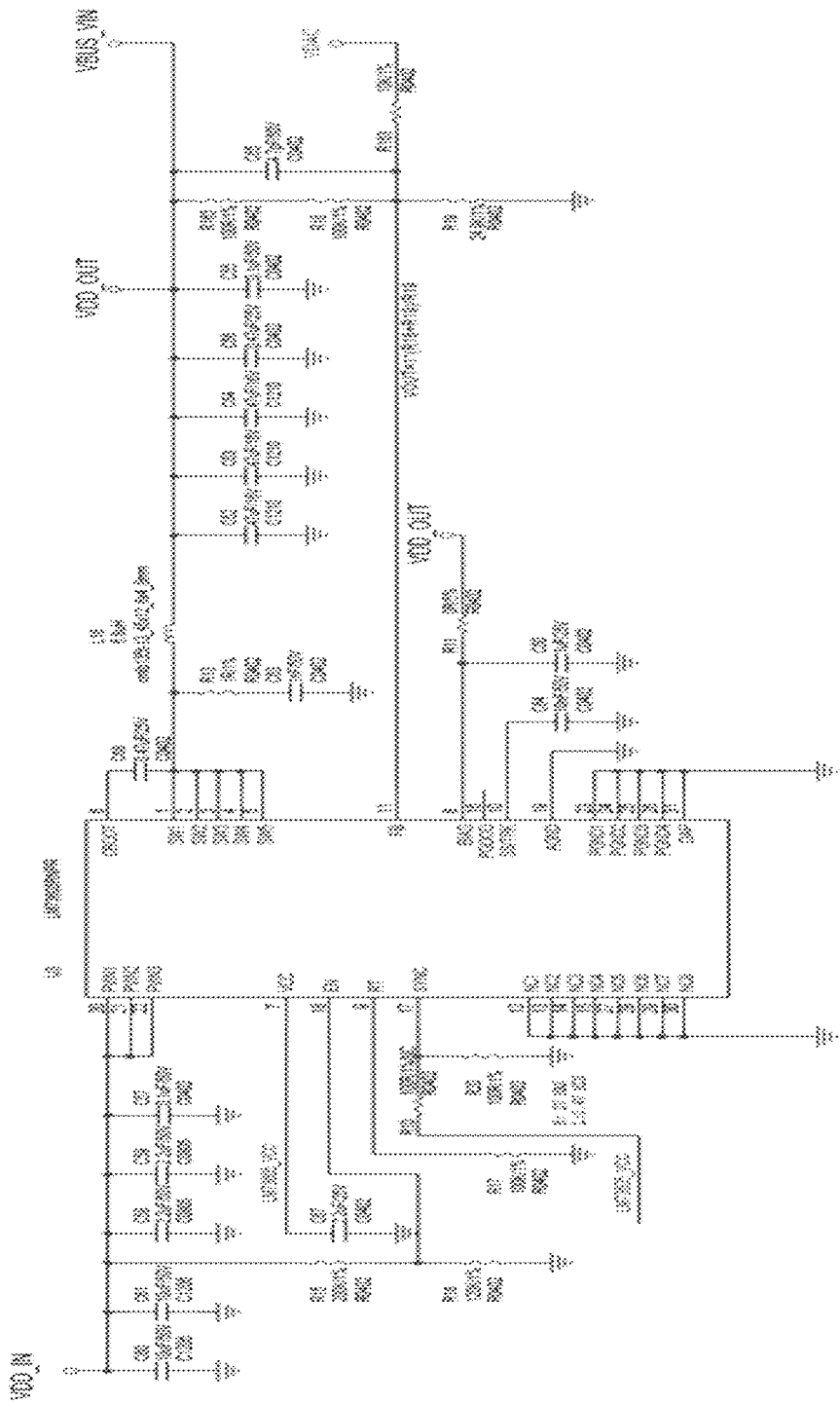
FIGS. 4A, 4B and 4C are circuit diagrams of an operational amplifier circuit provided in an embodiment of the present application.
Figure 4B:
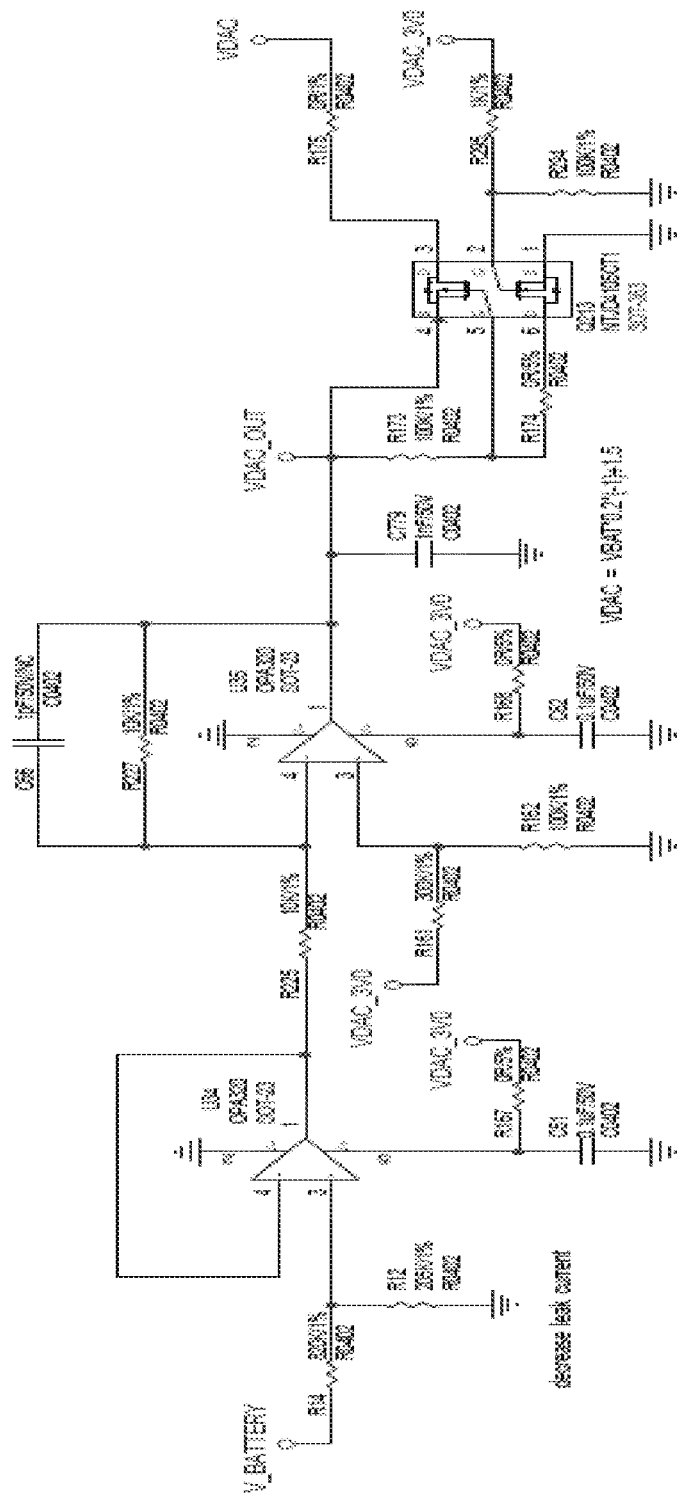
Figure 4C:
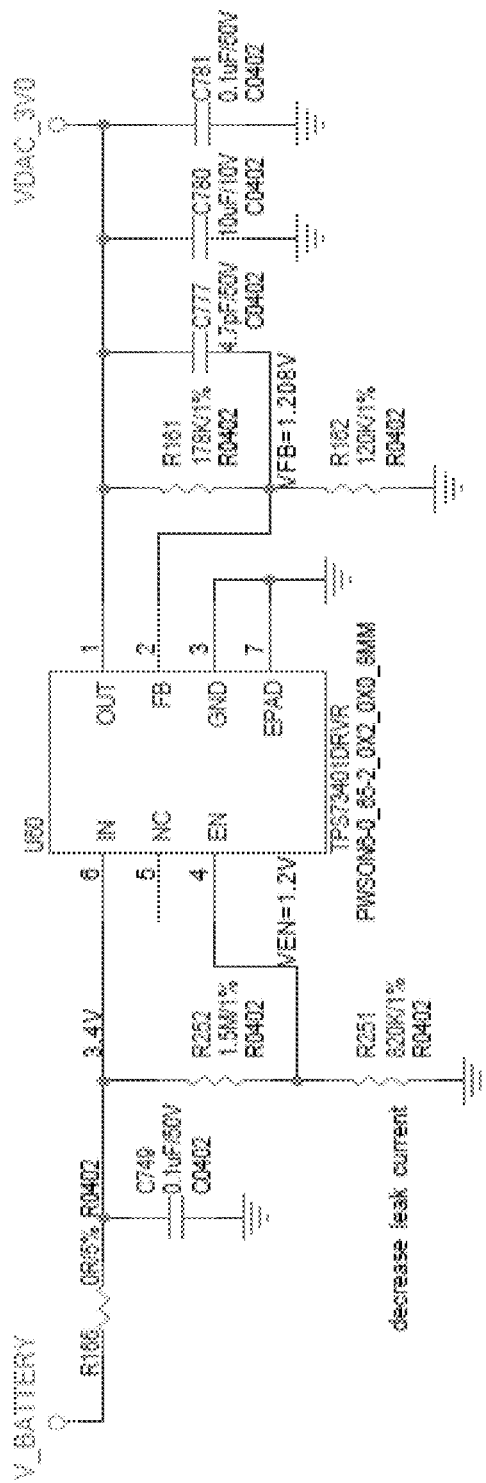

In the present embodiment, the voltage adjustment module 40 is configured for charging the first charging chip 103 and the second charging chip 202, and is further configured for adjusting an input voltage of the second charging chip 202. In the present embodiment, in order to ensure that the second charging chip 202 normally works, the voltage of the battery connected to the second output end 102 and the third output end 201 is required to be fed back to the constant voltage adjustment module 4011 by means of the operational amplifier circuit 402, and the constant voltage adjustment module 401 adjusts the input voltage of the second charging chip 202 according to the fed-back voltage of the battery. Specifically, the input voltage of the second charging chip 202 may be set to be 2 times as high as the voltage of the battery, which depends on the two-phase switched capacitor architecture; and the circuit architecture performs outputting at the duty ratio of 50%, so that the input voltage is 2 times as high as the output voltage, and an input current is a half of an output current. The operational amplifier circuit 402 may specifically refer to FIGS. 4A, 4B and 4C. The operational amplifier circuit 402 works based on a principle that: the voltage of the battery is fed back to a FB pin of the constant voltage adjustment module 40 by a two-stage operational amplifier, and the FB pin adjusts the output voltage to be 2 times as high as the voltage of the battery by an internal comparer by means of R163, R18 and R19, wherein an output formula of the two-stage operational amplifier is expressed as: $VDAC=V\_BATTERY*0.2*(-1)+1.5$. It is noteworthy that adjusting the output voltage to be 2 times as high as the voltage of the battery is achieved by setting a corresponding resistance value, the resistance in the circuit may also be changed according to an actual application, and thus, the output voltage is adjusted to be other numerical values and is not limited to the 2 times as high as the voltage of the battery. In addition, FIGS. 4A-4C are only used as examples of the operational amplifier circuit 402, but is not intended to limit the operational amplifier circuit 402.

In the present embodiment, the two charging chips may be matched to be used, so that a highest charging speed is achieved with the lowest power consumption. For example, the charging apparatus 1000 is utilized to charge the vehicle diagnosis tablet computer, when the vehicle diagnosis tablet computer is in a power-on state, the microprocessor 30 may control the first charging chip 103 the output a 5 A charging current and control the second charging chip 202 to output a 8 A charging current, moreover, a 2 A charging current of the first charging chip 103 supplies power to the system of the vehicle diagnosis tablet computer by means of the first output end 101, a 3 A charging current of the first charging chip 103 and the 8 A charging current of the second charging chip 202 respectively charge the battery of the vehicle diagnosis tablet computer by means of the second output end 102 and the third output end 201, and therefore, a 11 A charging current may be supplied to the battery. When the vehicle diagnosis tablet computer is in a power-off state, the power consumption of the current of the first output end 101 is zero, the microprocessor 30 controls the first charging chip 103 to output the 5 A charging current to the battery by means of the second output end 102 and controls the second charging chip 202 to output the 8 A charging current to the battery by means of the third output end 201, and therefore, a 13 A charging current may be supplied to the battery. Compared with the prior art, the present application has the advantage that the charging speed of the battery is obviously increased.

An embodiment of the present application provides a charging apparatus. A microprocessor controls output voltages of a first charging chip 103 and a second charging chip 202 to be adjustable, so that a to-be-charged device can achieve a higher charging voltage, the charging speed of the to-be-charged device is increased, the charging time is shortened, and the comfortable experience that full charging is completed by a user within a short time is met. In addition, the second charging chip 202 is specifically of a two-phase switched capacitor architecture by which the control on the duty ratio of 50% can be achieved, and a current of an actual cable is a half of a current supplied to the to-be-charged device, so that the energy loss on the charging cable is reduced, and the temperature rise of the device in an application can be limited.

Figure 5:
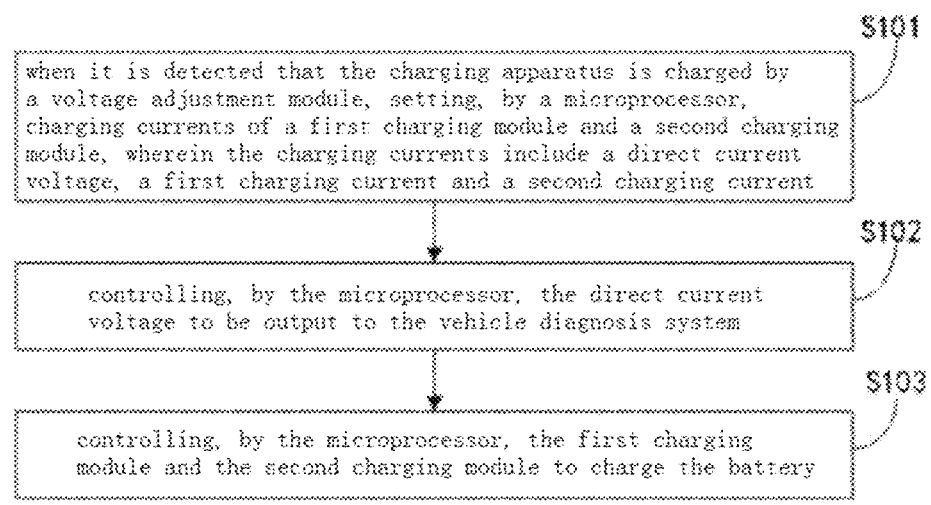
FIG. 5 is a process diagram of a charging method provided in an embodiment of the present application.

Based on the above-mentioned charging apparatus 1000, an embodiment of the present application further provides a charging method applied to a vehicle diagnosis tablet computer including a vehicle diagnosis system and a battery, wherein the charging method is executed by the above-mentioned charging apparatus 1000. Reference is made to FIG. 5, the charging method includes:

S101, when it is detected that the charging apparatus is charged by a voltage adjustment module, a microprocessor sets charging currents of a first charging module and a second charging module, wherein the charging currents include a direct current voltage, a first charging current and a second charging current;

S102, the microprocessor controls the direct current voltage to be output to the vehicle diagnosis system; and S103, the microprocessor controls the first charging module and the second charging module to charge the battery.

Figure 6:
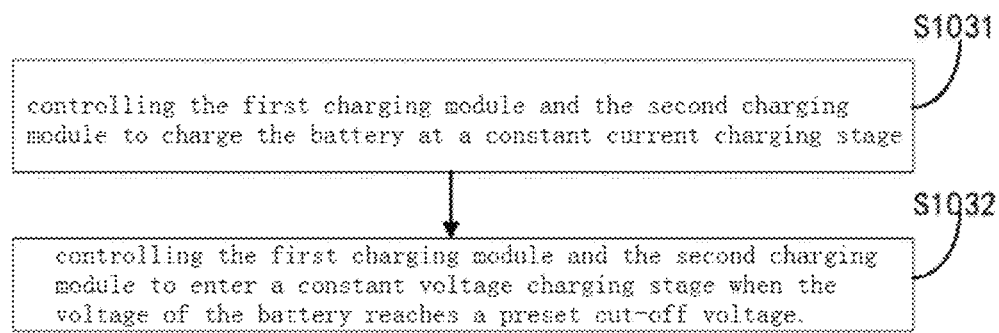
FIG. 6 is a process diagram of a method that a microprocessor controls a first charging module and a second charging module to charge a battery in an embodiment of the present application.

Reference is made to FIG. 6, the step that the microprocessor controls the first charging module and the second charging module to charge the battery includes:

S1031, the first charging module and the second charging module are controlled to charge the battery at a constant current charging stage; and S1032, the first charging module and the second charging module are controlled to enter a constant voltage charging stage when the voltage of the battery reaches a preset cut-off voltage.

At the constant voltage charging stage, when the second charging current of the second charging module is smaller than or equal to a first preset cut-off current, the second charging module stops charging the battery, and when the first charging current of the first charging module is smaller than or equal to a second preset cut-off current, the first charging module stops charging the battery.

In some embodiments, when the vehicle diagnosis system is in a power-off state, the charging method further includes that: the microprocessor adjusts the direct current voltage to be zero and adjusts the first charging current as the maximum current of the first charging module; and the microprocessor charges the battery according to the maximum current and the second charging current.

The above-mentioned steps S101 to S103 are performed by the charging apparatus 1000 in the above-mentioned embodiment and may be specifically implemented with reference to the above-mentioned charging apparatus 1000, the descriptions thereof are omitted herein.

Figure 7:
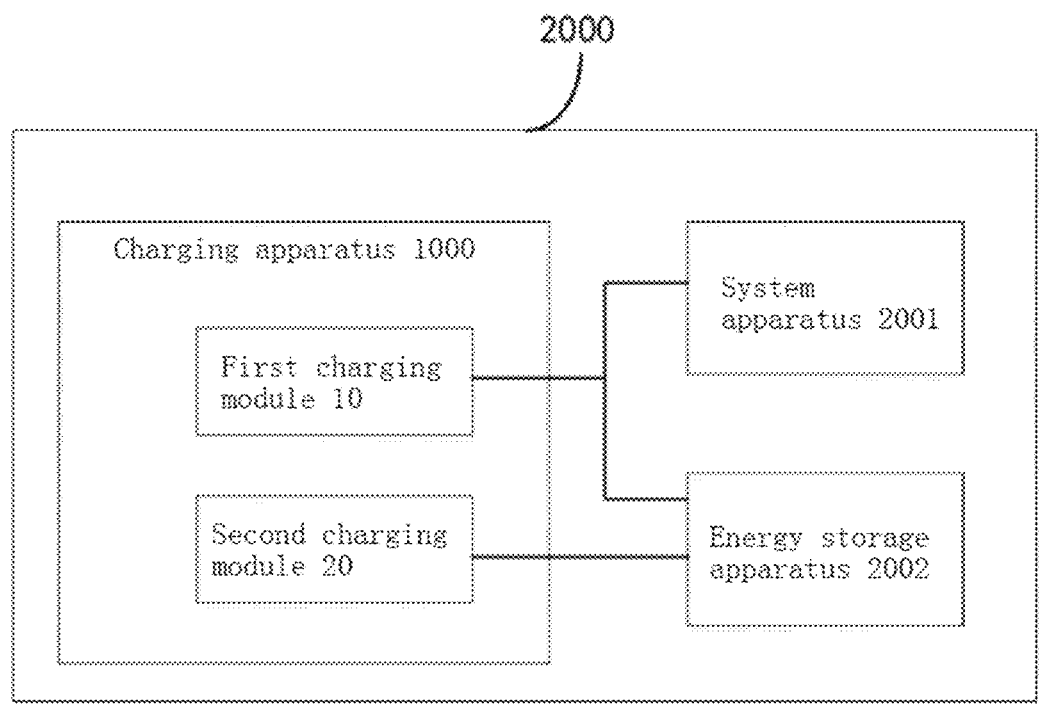
FIG. 7 is a schematic diagram showing a structure of an electronic device provided in an embodiment of the present application.

FIG. 7 is a schematic diagram showing a structure of an electronic device provided in an embodiment of the present application. As shown in FIG. 7, the electronic device 2000 includes the charging apparatus 1000 as shown in the above-mentioned embodiment, a system apparatus 2001 and an energy storage apparatus 2002. The system apparatus 2001 is connected to a first charging module 10, and the energy storage apparatus 2002 is connected to the first charging module 10 and a second charging module 20.

In the present embodiment, the charging apparatus 1000 is configured for supplying electric energy to the system apparatus 2001 by means of the first charging module 10 and charging the energy storage apparatus 2002 by means of the first charging module 10 and the second charging module 20. When the electronic device 2000 is in a power-off state, all currents of the first charging module 10 are configured for charging the energy storage apparatus 2002.

The energy storage apparatus 2002 may be specifically a battery or battery pack, and the system apparatus 2001 may be specifically a system module of the electronic device 2000.

In the present embodiment, the electronic device 2000 may be a product including any high-capacity battery. The electronic device 2000 is a vehicle diagnosis tablet computer, a vehicle anti-theft product detection device, a four-wheel aligner detection device, a vehicle emergency power supply or the like.

An embodiment of the present application provides an electronic device 2000. The electronic device 2000 includes a charging apparatus 1000, an energy storage apparatus 2002 and a system apparatus 2001. The charging apparatus 1000 includes a first charging module 10, a second charging module 20, a microprocessor 30, and a voltage adjustment module 40. The first charging module 10 is provided with a first output end 101 and a second output end 102, the second charging module 20 is provided with a third output end 201, wherein a direct current voltage output by the first output 101 end is supplied to the system apparatus 2001, the charging current output by the second output 102 end and the third output end 201 is supplied to the energy storage apparatus 2002, and the currents output by the three output ends may be controlled by the microprocessor 30, so that fast charging of the electronic device 1000 is achieved, and the standby capability of the electronic device 1000 is improved.

The embodiments of the above-mentioned apparatus are merely schematic, wherein the units described as a separation component may be or not be physically separated, and a component serving as a unit for display may be or not be a physical unit, that is, they may be located on the same place or distributed on a plurality of network units. Parts or all of the modules may be selected according to an actual demand to achieve the purpose of the solution in the present embodiment.

By describing the above-mentioned implementation manners, the ordinary skill in the art may clearly know that all the implementation manners may be achieved in a software and general-purpose hardware platform combination manner, of course, they may also be achieved by virtue of hardware. It may be understood by the ordinary skill in the art that the implementation of all or parts of processes in the methods in the above-mentioned embodiments may be completed by relevant hardware instructed by a computer program which may be stored in a computer readable storage medium, and when the program is executed, the processes in the embodiments of all the above-mentioned methods may be included. The storage medium may be a diskette, an optical disk, an ROM (Read-Only Memory) or an RAM (Random Access Memory) and the like.

Finally, it should be noted that the above-mentioned embodiments are merely used to describe the technical solutions of the present application, rather than to limit the technical solutions. Based on the concept of the present application, technical features of the above-mentioned embodiments or different embodiments may also be combined according to steps which may be achieved in an arbitrary sequence, there are many other variations in the above-mentioned different aspects of the present application, and for simplicity, they are not provided in detail. Although the present application has been described in detail with reference to the above-mentioned embodiments, it should be understood by the ordinary skill in the art that the technical solutions recorded in all the above-mentioned embodiments may still be modified, or parts of the technical solutions may be equivalently replaced; and these modifications or replacements do not make the essences of the corresponding technical solutions depart from the scope of the technical solutions of all the embodiments of the present application.

The invention claimed is:

1. A charging apparatus, applied to a vehicle diagnosis tablet computer comprising a vehicle diagnosis system and a battery, wherein the charging apparatus comprises:
   a first charging module provided with a first output end outputting a direct current voltage and a second output end outputting a first charging current, wherein the direct current voltage is supplied to the vehicle diagnosis system;
   a second charging module provided with a third output end outputting a second charging current, wherein the battery is charged by the first charging current and the second charging current;
   a microprocessor connected to the first charging module and the second charging module, and the microprocessor being configured for controlling the first charging module and the second charging module to charge the battery; and
   a voltage adjustment module connected to the first charging module and the second charging module, the voltage adjustment module being configured for charging the first charging module and the second charging module, and configured for adjusting an input voltage of the second charging module.

2. The charging apparatus of claim 1, wherein the first charging module comprises a first charging chip and an inductor, the first charging chip is respectively connected to the inductor, the microprocessor and the voltage adjustment module, the inductor is connected to the first output end and the second output end, and the first charging chip is configured for supplying power to the vehicle diagnosis system by means of the inductor and charging the battery.

3. The charging apparatus of claim 2, wherein the inductor is configured for reducing the power consumption of the first charging module, wherein the inductance of the inductor is greater than or equal to 1 uH and is smaller than or equal to 2 uH, and the internal resistance of the inductor is 0.01 ohm.

4. The charging apparatus of claim 1, wherein the second charging module is a second charging chip with a two-phase switched capacitor architecture, and the second charging chip is configured for supplying the second charging current to the battery by means of the third output end.

5. The charging apparatus of claim 1, wherein the voltage adjustment module comprises a constant voltage adjustment module and an operational amplifier circuit, the constant voltage adjustment module is connected to the first charging module and the second charging module, and the operational amplifier circuit is connected to the constant voltage adjustment module;
   the constant voltage adjustment module is configured for receiving a charging voltage and converting the charging voltage into a constant voltage; and
   the operational amplifier circuit is configured for acquiring a voltage of the battery and inputting the voltage of the battery to the constant voltage adjustment module so that the input voltage of the second charging module is adjusted by the constant voltage adjustment module according to the voltage of the battery.

6. The charging apparatus of claim 5, wherein the voltage adjustment module further comprises an adapter connected to the constant voltage adjustment module; and
   the adapter is configured for inputting the charging voltage to the constant voltage adjustment module.

7. The charging apparatus of claim 5, wherein the microprocessor is respectively connected to the first charging module and the second charging module by means of an I2C bus.

8. The charging apparatus of claim 1, wherein the microprocessor controls the first charging module and the second charging module to charge the battery by means of:
   controlling the first charging module and the second charging module to charge the battery at a constant current charging stage; and
   controlling the first charging module and the second charging module to enter a constant voltage charging stage when the voltage of the battery reaches a preset cut-off voltage.

9. The charging apparatus of claim 8, wherein the microprocessor controls the first charging module and the second charging module to enter the constant voltage charging stage by means of:
   stopping the second charging module charging the battery when the second charging current of the second charging module is smaller than or equal to a first preset cut-off current; and
   controlling the first charging module to further charge the battery.

10. The charging apparatus of claim 9, wherein the microprocessor is configured for stopping the first charging module charging the battery when the first charging current of the first charging module is smaller than or equal to a second preset cut-off current.

11. A charging method, applied to a vehicle diagnosis tablet computer comprising a vehicle diagnosis system and a battery, wherein the charging method is executed by the charging apparatus of claim 1, and the charging method comprises:
   when it is detected that the charging apparatus is charged by a voltage adjustment module, setting, by a microprocessor, charging currents of a first charging module and a second charging module, wherein the charging currents comprise a direct current voltage, a first charging current and a second charging current;
   controlling, by the microprocessor, the direct current voltage to be output to the vehicle diagnosis system; and
   controlling, by the microprocessor, the first charging module and the second charging module to charge the battery;
   wherein the first charging module outputs the direct current voltage and the first charging current, and the second charging module outputs the second charging current.

12. The charging method of claim 11, wherein the step of controlling, by the microprocessor, the first charging module and the second charging module to charge the battery comprises:
   controlling the first charging module and the second charging module to charge the battery at a constant current charging stage; and
   controlling the first charging module and the second charging module to enter a constant voltage charging stage when the voltage of the battery reaches a preset cut-off voltage.

13. The charging method of claim 12, wherein the step of controlling the first charging module and the second charging module to enter the constant voltage charging stage when the voltage of the battery reaches the preset cut-off voltage comprises:
   when the second charging current of the second charging module is smaller than or equal to a first preset cut-off current, stopping the second charging module charging the battery; and when the first charging current of the first charging module is smaller than or equal to a second preset cut-off current, stopping the first charging module charging the battery.

14. The charging method of claim 11, wherein when the vehicle diagnosis system is in a power-off state, the charging method further comprises:
adjusting, by the microprocessor, the direct current voltage to be zero, and adjusting the first charging current as the maximum current of the first charging module; and
charging, by the microprocessor, the battery according to the maximum current and the second charging current.

15. An electronic device, wherein the electronic device comprises a charging apparatus which is applied to a vehicle diagnosis tablet computer comprising a vehicle diagnosis system and a battery, the charging apparatus comprising:
a first charging module provided with a first output end outputting a direct current voltage and a second output end outputting a first charging current, wherein the direct current voltage is supplied to the vehicle diagnosis system;
a second charging module provided with a third output end outputting a second charging current, wherein the battery is charged by the first charging current and the second charging current;
a microprocessor connected to the first charging module and the second charging module and configured for controlling the first charging module and the second charging module to charge the battery; and
a voltage adjustment module connected to the first charging module and the second charging module, configured for charging the first charging module and the second charging module and further configured for adjusting an input voltage of the second charging module.

16. The electronic device of claim 15, wherein the first charging module comprises a first charging chip and an inductor, the first charging chip is respectively connected to the inductor, the microprocessor and the voltage adjustment module, the inductor is connected to the first output end and the second output end, and the first charging chip is configured for supplying power to the vehicle diagnosis system by means of the inductor and charging the battery.

17. The electronic device of claim 15, wherein the second charging module is a second charging chip with a two-phase switched capacitor architecture, and the second charging chip is configured for supplying the second charging current to the battery by means of the third output end.

18. The electronic device of claim 15, wherein the voltage adjustment module comprises a constant voltage adjustment module and an operational amplifier circuit, the constant voltage adjustment module is connected to the first charging module and the second charging module, and the operational amplifier circuit is connected to the constant voltage adjustment module:
the constant voltage adjustment module is configured for receiving a charging voltage and converting the charging voltage into a constant voltage; and
the operational amplifier circuit is configured for acquiring a voltage of the battery and inputting the voltage of the battery to the constant voltage adjustment module so that the input voltage of the second charging module is adjusted by the constant voltage adjustment module according to the voltage of the battery.

19. The electronic device of claim 18, wherein the voltage adjustment module further comprises an adapter connected to the constant voltage adjustment module; and
the adapter is configured for inputting the charging voltage to the constant voltage adjustment module.

20. The electronic device of claim 15, wherein the microprocessor controls the first charging module and the second charging module to charge the battery by means of:
controlling the first charging module and the second charging module to charge the battery at a constant current charging stage; and
controlling the first charging module and the second charging module to enter a constant voltage charging stage when the voltage of the battery reaches a preset cut-off voltage.

* * * * *